J. O. MICHAUD.
TRANSMISSION GEARING FOR MOTOR CARS.
APPLICATION FILED NOV. 10, 1910.
993,862. Patented May 30, 1911.
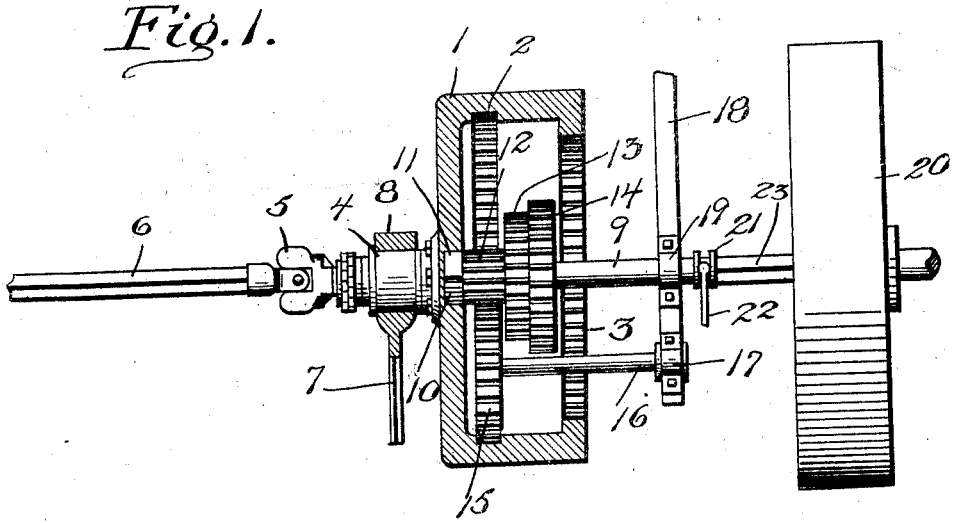
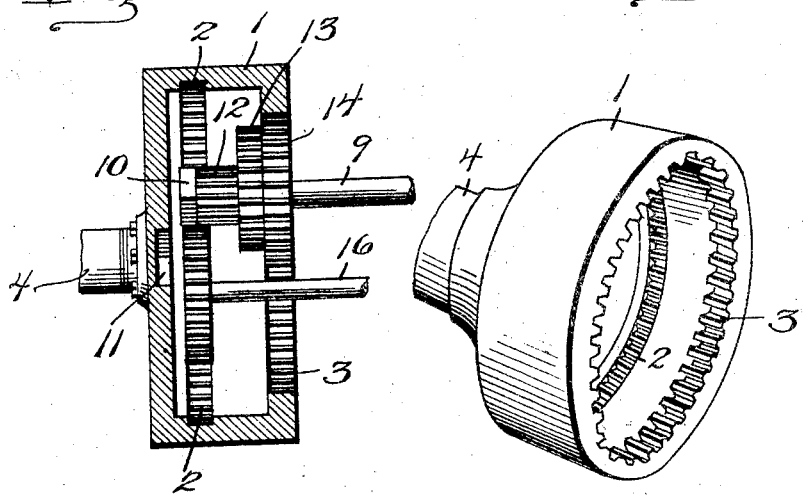
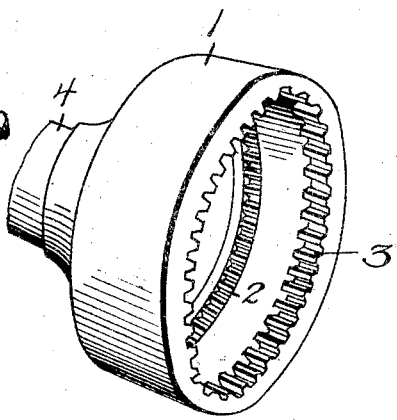
Inventor
J. O. Michaud.
Witnesses
E. H. Thomas
S. W. Cook
By Wm C McIntire
Attorney

UNITED STATES PATENT OFFICE.

JOSEPH OSARIO MICHAUD, OF FORT KENT, MAINE.

TRANSMISSION-GEARING FOR MOTOR-CARS.

993,862.  Specification of Letters Patent.  Patented May 30, 1911.

Application filed November 10, 1910. Serial No. 591,732.

*To all whom it may concern:*

Be it known that I, JOSEPH O. MICHAUD, a citizen of the United States, residing at Fort Kent, in the county of Aroostook and State of Maine, have invented certain new and useful Improvements in Transmission-Gearing for Motor-Cars; and I do hereby declare the following to be a full, clear, and exact description of the invention, such as will enable others skilled in the art to which it appertains to make and use the same.

This invention relates to improvements in transmission gearing, and particularly to devices used on motor cars. It is compact in form, and in the particular type illustrated four forward gear ratios and a reverse are provided.

The device is exceedingly simple and inexpensive to manufacture compared with the present transmissions commonly in use on motor cars.

With the above and other objects in view, the invention resides in the novel features of construction, combinations, formations and arrangements of parts to be hereinafter more fully described, claimed and illustrated in the accompanying drawings, in which—

Figure 1 is a partial vertical sectional view of the cup gear showing gears in the positions for high speed or direct drive; Fig. 2 is a partial vertical sectional view of the cup gear showing the gears in the position for third speed; and Fig. 3 is a perspective view of the cup gear.

Referring to the drawings by characters of reference, the numeral 1 represents a cup gear, having two sets of internally cut teeth 2 and 3. The gear is bolted in a suitable manner to a shaft 4, terminating in a universal joint 5, from which extends a square propeller shaft 6. A lever 7, terminating in a journal 8 surrounding the shaft 4, is provided to support the cup gear 1, and to move it when desired in a vertical plane. A shaft 9, extending within the cup gear 1, has its inner end terminating in a positive member 10, which it is possible to engage with the opposite member of the clutch 11 provided within the said gear. Three gears, 12, 13 and 14, are fixed on the shaft 9, directly back of the positive clutch 10, said gears being progressive in size. The outer end of the shaft 9 is hollow, having the opening of square section of a suitable size to receive the square shaft 23, terminating in one member of the clutch 20. On the outer end of the shaft 9 is mounted a collar 21, on which acts a yoke 22, for sliding said shaft in its bearing 19 and on the shaft 23. The reverse gear 15 is mounted on a shaft 16 and suitably journaled at 17 in the cross piece 18.

The operation of the device is as follows: With the clutch 20 in positive position and the engine rotating, the shaft 9 will revolve, being driven through the medium of the square shaft 23. In Fig. 1 the positive member 10 on the end of the shaft 9 is shown in engagement with its opposite member 11, formed within the cup gear 1, thus, since the shaft 9 is revolving, the cup gear will also revolve at the same rate of speed, transmitting its rotation through the universal joint 5 and the propeller shaft 6, and so on to the rear axle of the car. This is the position for the fourth or high speed of the car, and is a direct drive, with no gear reductions, from the engine direct to the propeller shaft 6. To obtain the three other forward speeds and reverse, the cup gear is moved in a vertical plane, and the gears on the shaft 9 moved out and in as required. To obtain the low or first speed ratio of gears, the gear 12 is moved out by means of the yoke 22 and into alinement with the internally cut gear 3, the cup gear then being slid in a vertical plane, by means of the lever 7 until the gears 3 and 12 are brought into mesh. To obtain the second speed, a similar operation is performed, except that the gear 13 is brought into alinement with the gear 3 and similarly engaged. To obtain the third speed, as illustrated in Fig. 2, the same operation is performed, except that the gear 14 is slid into alinement with the gear 3 and brought into mesh. To obtain the reverse speed, the shaft 9 is slid out until the positive clutch 10 is disengaged from the positive member 11, the gear 12 still being in mesh with the gear 15, the cup gear then being slid up in the opposite direction from that previously used until the internally cut gear 2 meshes with the gear 15.

Having fully described my invention, what I claim as new and desire to protect by Letters Patent is:

In a transmission gearing such as described, a shaft, a cup gear having a set of internally cut teeth mounted on the end thereof, means for shifting said cup gear in a transverse plane, a universal joint in the shaft to transmit rotation through various angles to a driven member, a square shaft with means for connecting or disconnecting the same with a source of power, an internally squared sleeve slidable on the said square shaft and suitably journaled in a support, a cone of gears mounted on the inner end of the said sleeve and extending within the cup gear, a shaft parallel to the aforementioned shaft, one end extending within the cup gear and the other end journaled in the aforementioned support, a reverse gear mounted on the inner end of the shaft and meshing with the smaller one of the cone gears, a second set of internally cut teeth mounted in the said cup gear to mesh with the said reverse gear when the said driven member is to be reversed, a positive clutch member formed on the inner end of the slidable sleeve, an opposite clutch member formed on the cup gear, and a collar mounted on the outer end of the slidable sleeve, together with an operating yoke engaging said collar, substantially as and for the purposes set forth.

In testimony whereof I affix my signature in presence of two witnesses.

JOSEPH OSARIO MICHAUD.

Witnesses:
 ARTHUR J. BADEAU,
 A. V. CURRIE.